(12) United States Patent
Hinz (10) Patent No.: US 9,177,471 B2
(45) Date of Patent: Nov. 3, 2015

(54) NAVIGATION SYSTEM (75) Inventor: Ole Hinz, Reinfeld (DE)

(73) Assignee: HARMAN BECKER AUTOMOTIVE SYSTEMS GMBH, Karlsbad (DE)

( * ) Notice: Subject to any disclaimer, the term of this patent is extended or adjusted under 35 U.S.C. 154(b) by 170 days.

(21) Appl. No.: 13/421,957

(22) Filed: Mar. 16, 2012

(65) Prior Publication Data
US 2012/0239281 A1 Sep. 20, 2012

(30) Foreign Application Priority Data
Mar. 17, 2011 (EP) ..................................... 11158720

(51) Int. Cl.
*G01C 21/32* (2006.01)
*G06F 17/30* (2006.01)
*G08G 1/0962* (2006.01)

(52) U.S. Cl.
CPC .............. *G08G 1/0962* (2013.01); *G01C 21/32* (2013.01); *G06F 17/30241* (2013.01)

(58) Field of Classification Search
CPC ... G01C 21/30; G01C 21/32; G06F 17/30241
USPC .................. 701/414, 421, 439, 516
See application file for complete search history.

(56) References Cited

U.S. PATENT DOCUMENTS

| 5,884,218 | A | * | 3/1999 | Nimura et al. | ................. 701/428 |
| 5,953,722 | A | * | 9/1999 | Lampert et al. | ................. 701/461 |
| 6,038,559 | A | * | 3/2000 | Ashby et al. | ................. 701/410 |
| 6,125,323 | A | * | 9/2000 | Nimura et al. | ................. 701/437 |
| 6,128,573 | A | * | 10/2000 | Nomura | ......................... 701/428 |
| 6,381,534 | B2 | * | 4/2002 | Takayama et al. | ............ 701/538 |
| 6,704,648 | B1 | * | 3/2004 | Naik et al. | ..................... 701/532 |
| 2009/0005926 | A1 | * | 1/2009 | Kaubisch | ......................... 701/26 |
| 2009/0157635 | A1 | * | 6/2009 | Fuchs et al. | ....................... 707/3 |
| 2010/0299370 | A1 | * | 11/2010 | Otto | .............................. 707/803 |
| 2011/0098912 | A1 | * | 4/2011 | Baselau et al. | ................ 701/200 |
| 2011/0113155 | A1 | * | 5/2011 | Kuznetsov et al. | ........... 709/241 |
| 2011/0118971 | A1 | * | 5/2011 | Petzold et al. | ................ 701/200 |

OTHER PUBLICATIONS

Magellan Maestro 3100 User Manual, 2007, Magellan Navigation Inc, 631459-01 A, pp. Cover thru iii, 11 and 12.*
European Search Report for European Application No. EP 11 158 720.0 dated Jul. 22, 2011, 10 pages.
Strang et al., "Vehicle Networks—Broadcast Systems," Deutsches Zentrum füt Luft-und Raumfahrt e.V., STI—Innsbruck, WS 2008/2009, BNSDOCID:<XP, 55002841A 1>, Nov. 10, 2008, 47 pages.
Unknown author, Intelligent Transport Systems (ITS)—Location Referencing for Geographic Databases, Part 3, Dynamic Location References (Dynamic Profile), *International Standard*, ISO/FDIS 17572-3, 2008, XP008096259, 94 pages.
Hiestermann, Volker, "Map-Independent Location Matching Certified by the AGORA-C Standard," Transportation Research Part C 16, 2008, pp. 307-319, 13 pages (also available at www.sciencedirect. com).

\* cited by examiner

*Primary Examiner* — Helal A Algahaim
*Assistant Examiner* — Dale W Hilgendorf
(74) *Attorney, Agent, or Firm* — Artegis Law Group, LLP (57) ABSTRACT

A system provides a description of a road segment using location reference points. The system may receive traffic information about a road segment along a road. The system may determine two sets of location reference points based on the traffic information. The system may generate a description of the road segment based on the two determined sets of location reference points.

19 Claims, 8 Drawing Sheets

NAVIGATION SYSTEM

BACKGROUND OF THE INVENTION

1. Priority Claim

This application claims the benefit of priority from European Patent Application 11 158 720.0, filed Mar. 17, 2011, which is incorporated by reference.

2. Technical Field

The present disclosure generally relates to navigation systems, and more specifically relates to navigation systems operable to provide accurate road descriptions to users or vehicles.

3. Related Art

In the past, paper and other hardcopy maps were used by explorers and drivers to navigate through geographic areas. With the advent of technology, explorers, drivers and vehicles used by such explorers and drivers now may use navigation systems to assist in providing geographic travel and route information. A need exists for a navigation system that can create or generate a unique description of an area or route that may be of importance to a user, in order to provide accurate and relevant information.

SUMMARY

A system provides a description of a road segment using location reference points. The system may receive traffic information about a road segment along a road. The traffic information may be associated with one or more core points along the road. The system may determine two sets of location reference points based on the traffic information. A first set of location reference points may identify the road that the road segment is located on. A second set of location reference points may further delineate the location of the road segment along the road. The system may generate a description of the road segment based on the two determined sets of location reference points.

Other systems, methods, features and advantages will be, or will become, apparent to one with skill in the art upon examination of the following figures and detailed description. It is intended that all such additional systems, methods, features and advantages be included within this description, be within the scope of the invention, and be protected by the following claims.

BRIEF DESCRIPTION OF THE DRAWINGS

The system may be better understood with reference to the following drawings and description. The components in the figures are not necessarily to scale, emphasis instead being placed upon illustrating the principles of the invention. Moreover, in the figures, like referenced numerals designate corresponding parts throughout the different views.

DETAILED DESCRIPTION OF THE PREFERRED EMBODIMENTS

Users, drivers, explorers, businesses, computer systems, and various other entities ("users") may use one or more navigation devices or systems ("navigation system") to gather data and information about various travel and geographic features and conditions. For example, users may gather information about distances, routes, locations, travel times, and events or incidents which may occur at or on one or more route segments (sometimes referred to as "traffic events"). Examples of route segments with traffic events that may be gathered or relayed to users by a navigation system may include a portion of a route or road that is closed, a portion of a road where an accident may have taken place, a portion of a road where the road may be narrowed, a portion of the road where one or more lanes may be closed, a portion of the road where traffic may be identified as being heavy or stopped, a portion of the road where the road segment may be identified as having traffic congestion, or various other road segments with traffic events.

Users such as drivers and vehicle navigation systems may gather and use the traffic and road information to, for example, determine a route between two or more points, to chart a path to one or more predefined destination location, to know or understand traffic and road information, to be alerted to incidents or events taking place at one or more route location or segment, or for various other reasons. While the following discussion may focus on paths or roads through or between geographic areas, navigation systems may use the same or similar techniques in other areas. For example, users such as professional hunting guides, military personnel, boats, or various other users traveling through a geographic area may gather and use route information to, for example, determine a route between or to various points, or to identify areas or route segments where an event may be occurring. Various other examples are contemplated.

Figure 1:
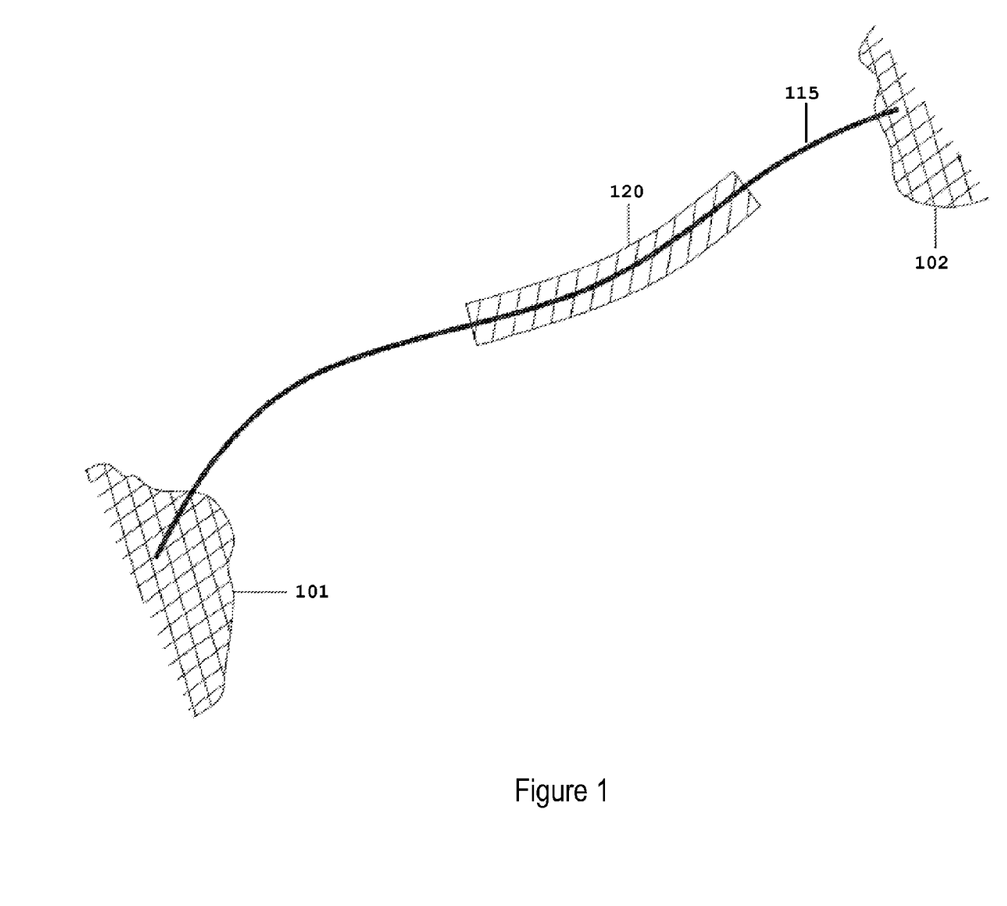
FIG. 1 is a diagram of an example route section in a geographic setting.

FIG. 1 shows a diagram of an example route or road segment 120 ("road segment") of a route or road 115 ("road"), and two geographic objects or geographic areas ("geographic areas") 101 and 102. One or more of the geographic areas 101 and 102 may be, for example, a village, town, city, urban agglomeration, geographic feature such as a mountain or forest, designated area such as a parking lot, neighborhood, or bounded area, or may be various other geographic features or areas. The road 115 may exist, be located between, and connect the two geographic areas 101 and 102.

The road segment 120 may be or represent a portion of the road 115 experiencing a traffic event. For example, the road segment 120 may represent a portion of the road 115 which may be closed. The road segment 120 may exist and be located between the two geographic areas 101 and 102. The road segment 120 may represent part or all of a road 115 having a high, low, or any intermediate road classification.

In gathering and disseminating travel and route information to users, it may be important for a navigation system to be configured or operable to accurately, efficiently, and precisely identify or describe certain route segments experiencing one or more traffic events, such as road segment 120. Navigation systems may identify, obtain, or create a description of the road segment 120 to be used or displayed to a user in various ways.

For example, navigation systems may implement, adhere to, or use one or more protocols for identifying or describing a road segment and providing road or traffic messages to a user. As an example, International Organization for Standardization ("ISO") 14819-1 is a protocol that is designed to provide event-oriented messages for an end user that may be presented to a user. The IDSO 14819-1 standard identifies and describes the message structure, content, and presentation to the end user, and uses Radio Data System Traffic Message Channel ("RDS-TMC") messages broadcast via air to a radio receiver.

In the ISO 14819-1 standard, different locations of traffic events may be coded using one or more predefined tables of locations. For example, a navigation system may search for and identify or otherwise determine that the geographic areas 101 and 102 may be contained in a location table, such as a location table used by a TMC decoder. As the road 115 between geographic areas 101 and 102 has no junction, the navigation system may identify the road segment 120 as a road segment located between geographic areas 101 and 102.

Figure 2:
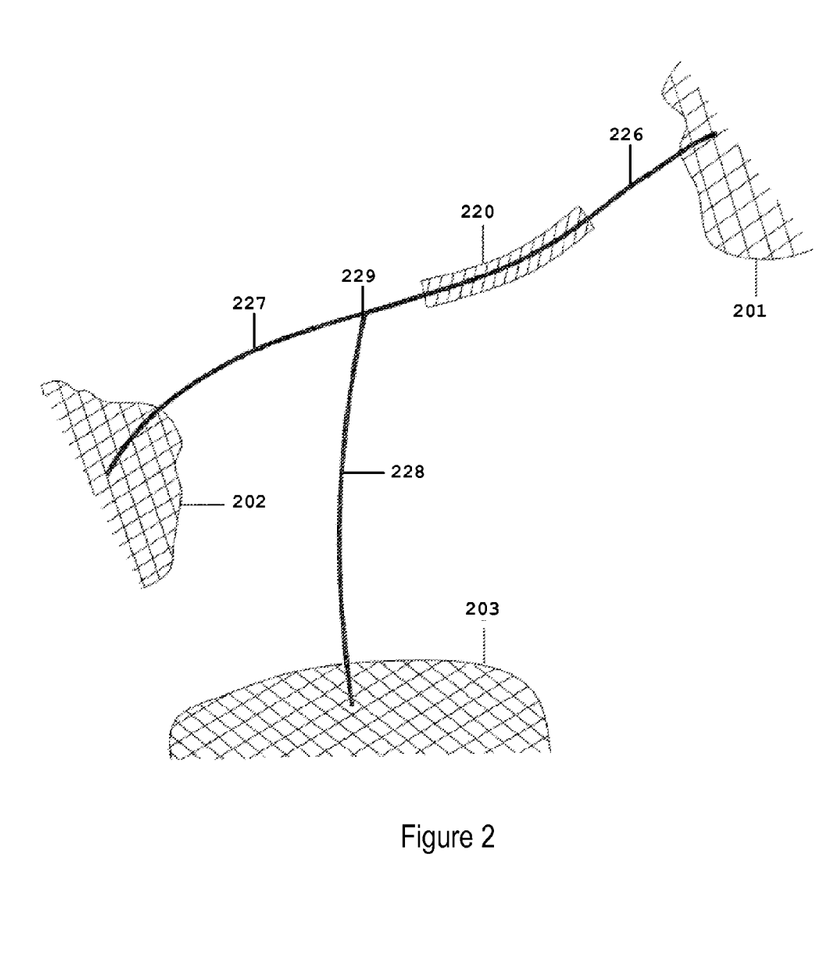
FIG. 2 is a diagram of an example route section in a geographic setting.
Figure 3:
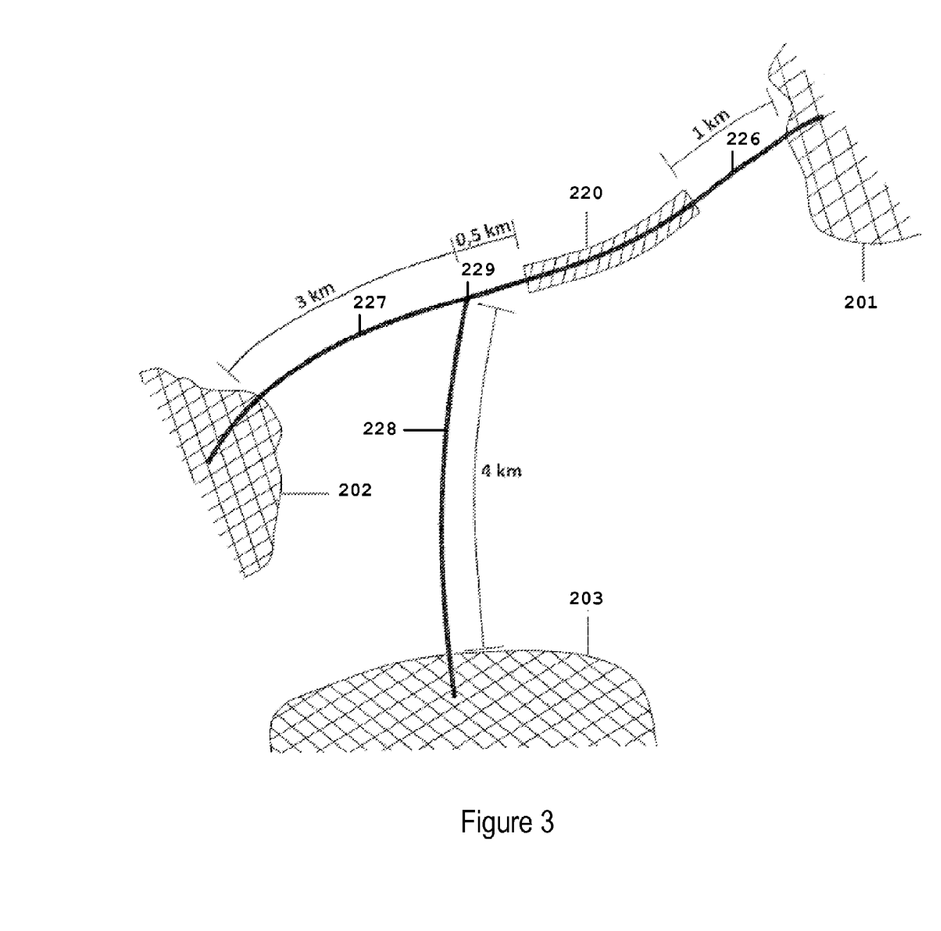
FIG. 3 is a diagram of an example route section in a geographic setting.

FIG. 2 shows a diagram of an example road segment 220, three roads 226, 227, and 228, and three geographic areas 201, 202, and 203. FIG. 3 shows a specific example of the diagram of FIG. 2, with various distances between the components listed as an example.

One or more of the geographic areas 201, 202, and 203 may be the same as, similar to, or resemble one or more of the geographic areas 101 and 102. One or more of the geographic areas 201, 202, and 203 may be, for example, a village, town, city, urban agglomeration, geographic feature such as a mountain or forest, designated area such as a parking lot, neighborhood, or bounded area, or may be various other geographic features or areas. Roads 226 and 227 may form a road that may exist between and connect geographic area 201 and geographic area 202. Roads 226 and 228 may form a road that may exist between and connect geographic area 201 and geographic area 203. Roads 226, 227, and 228 may form a three way junction at point 229. Road segment 220 may be the same as, similar to, or resemble the road segment 120, or may be different. The road segment 220 may have or experience a traffic event.

In the example of FIG. 2, the road segment 220 may be located or lie between the geographic areas 201 and 202, and may lie between the geographic areas 201 and 203. In this example, a navigation system may need to use or incorporate one or more criteria to determine which of the geographic areas 201, 202, and 203 to use in identifying and describing the road segment 220.

For example, one criterion a navigation system may incorporate for determining whether to describe the road segment 220 as being located between the geographic areas 201 and 202 or the geographic areas 201 and 203 may be to determine which of the geographic areas 202 or 203 is closer to the road segment 220. In the specific example shown in FIG. 3, the navigation system may determine that the geographic area 202, which may be 3.5 km from the road segment 220, is closer to the than the geographic area 203, which may be 4.5 km from the road segment 220. In this example, the navigation system may identify and describe the road segment 220 with reference to the geographic areas 201 and 202, such as by describing the road segment 220 as lying between the geographic areas 201 and 202.

Another example of a criterion that a navigation system may use in determining how to describe the road segment 220 may be to determine or identify which of the two geographic areas 202 or 203 has a higher population. For example, the navigation system may identify the number of people living in a village represented by geographic area 202 and the number of people living in a village represented by geographic area 203. The geographic area 202 or 203 with the highest population may be considered the most pertinent or relevant data point, and thus may be used. For example, where the geographic area 203 has a higher population than the geographic area 202, the road segment 220 may be identified or described as lying between the geographic areas 201 and 203.

Another example of a criterion that a navigation system may use in determining how to describe the road section 220 may be the name of the road. For example, if the road between the geographic areas 201 and 203 formed by roads 226 and 228 has one name (such as Highway L123), whereas road 227 between the geographic area 202 and the junction 229 has a different name (such as County Road A), then the road segment 220 could be described as lying between the geographic areas 201 and 203. Alternatively, if the road between the geographic areas 201 and 202 formed by roads 226 and 227 has one name, and road 228 has a different name, then the road segment 220 could be described as lying between the geographic areas 201 and 202. Other examples and criteria for describing a road segment 220 are possible.

While the ISO 14819-1 standard or other methods using two geographic areas or points for identification and description of a road segment may be useful in alerting users to traffic conditions on high road classes such as motorways, highways, or interstates ("highways"), the ISO 14819-1 standard may not be helpful or useful in identifying a traffic event that may occur on non-highway roads or other roads that have a low road class number. In contrast to a road segment on a highway where it may not be possible to leave a highway between two connection points, it might be difficult or not possible to uniquely identify a road of lower importance than a highway in a given road grid or network using an RDS-TMC code because the location tables used by the ISO 14819-1 standard or TMC message may not include two locations or connection points which could delimit the closed road segment.

Figure 4:
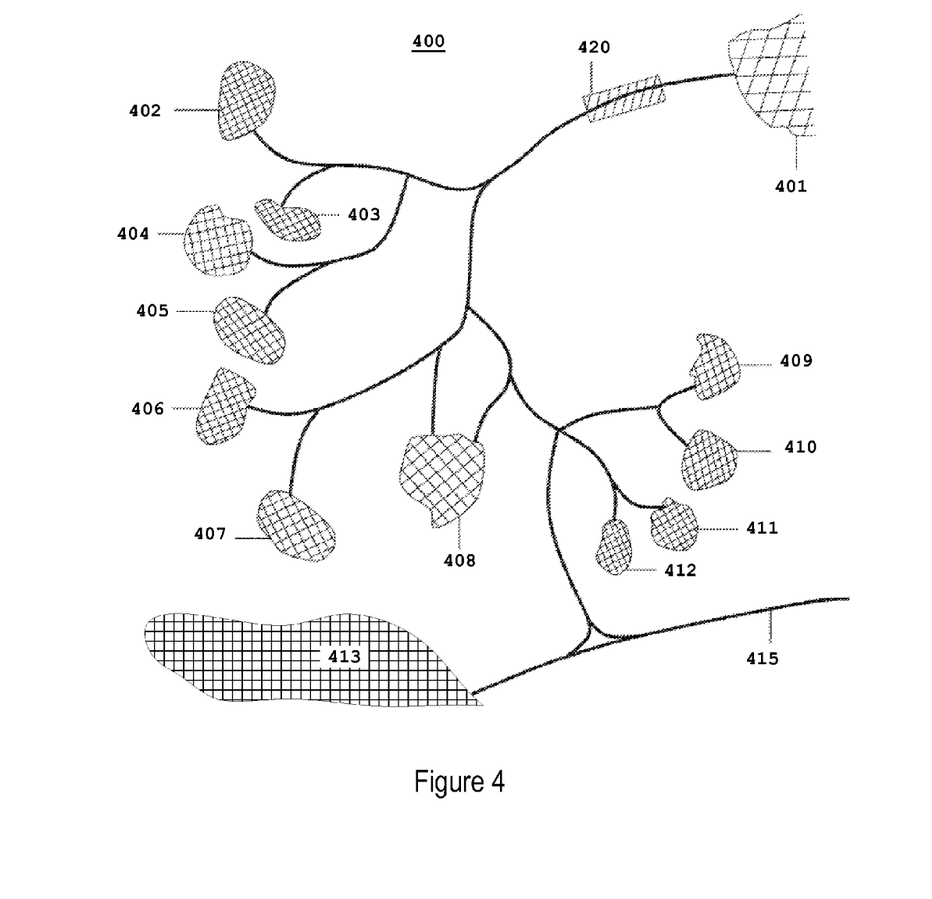
FIG. 4 is a diagram of an example route section in a geographic setting.

For example, FIG. 4 shows a diagram of a more complex road network 400. The road network 400 includes a road segment 420, which may be the same as, similar to, or otherwise resemble a road segment 120 or 220, and may have or experience a traffic event. The road network 400 may also include thirteen geographic areas 401-413, any of which may be the same as, similar to, or otherwise resemble any of the geographic areas 101, 102, 201, 202, or 203. One or more of the geographic areas 401-413 may be, for example, a village, town, city, urban agglomeration, geographic feature such as a mountain or forest, designated area such as a parking lot, neighborhood, or bounded area, or may be various other geographic features or areas. FIG. 4 also shows a road 415 as well as various other roads which may exist, lie between, and interconnecting one or more of the geographic areas 401-413.

Describing road segments such as the road segment 420 of complex road networks, such as the road network 400, using only two geographic locations located near or in a neighborhood of the road segment 420 may not provide a satisfactory identification or description of the road segment 420. Such a description identifying two geographic areas located along a road including the road segment 420 may not be enough to allow a user to identify the closed road segment.

Figure 5:
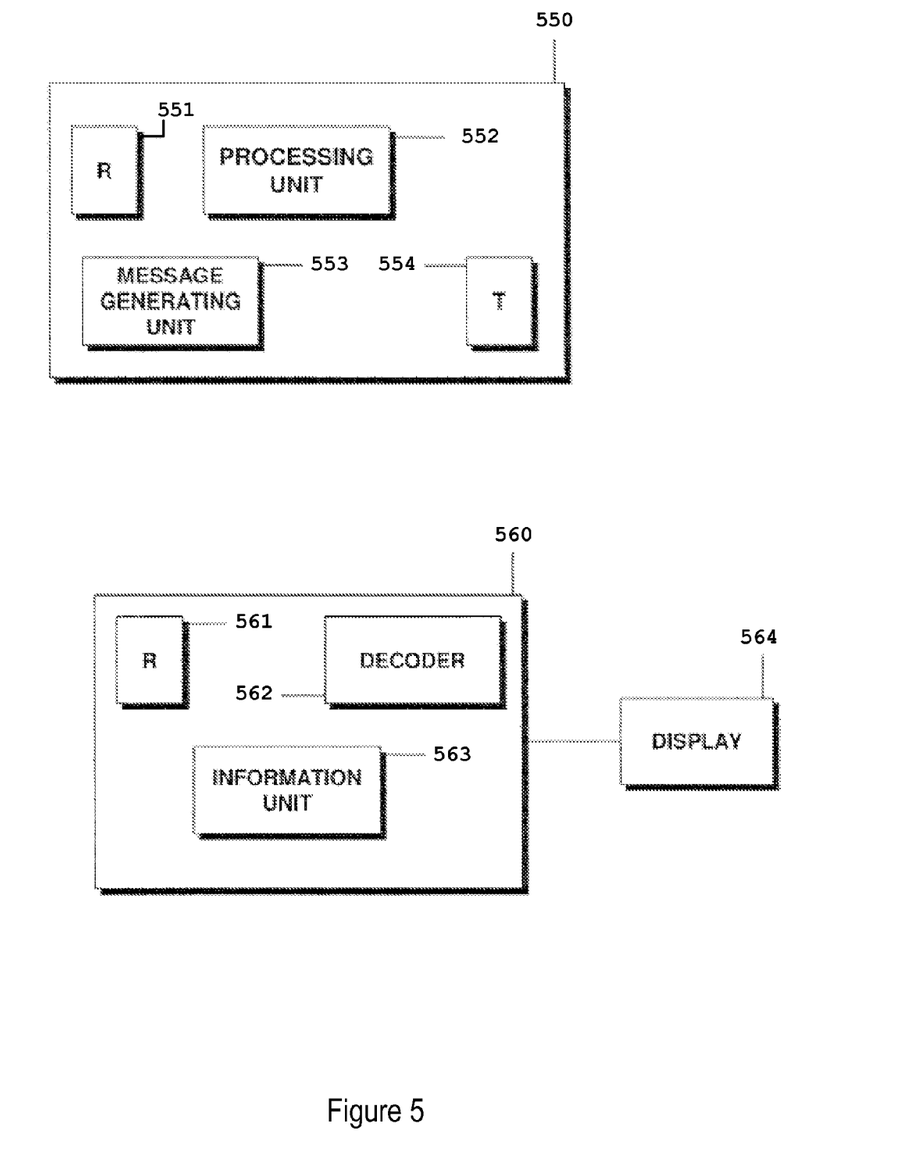
FIG. 5 is a block diagram of an example navigation system.

FIG. 5 shows an example of a navigation system 550 that may be configured or operable to identify or describe a road segment in various ways. The system 550 may be able to describe a road segment in ways superior to merely identifying two geographic areas located along or in proximity to the road segment. The system 550 may be configured or operable to describe a road segment with one or more location reference points and core points.

Where the location reference points are location reference extension points, the location reference points may be located in one or more databases or with one or more geographic information servers. In these circumstances, messages sent with the location reference points may be adhered to according to one or more protocols, such as the ISO 17572-3. For example, the road segment may be identified in the geographic database on the basis of location reference points allowing a unique identification of the road segment in the geographic database, such as based on a dynamic location references technique according to ISO 17572-3. In other examples, the location reference points may be various other location reference points.

The navigation system 550 may include one or more receiver (R) 551. The receiver 551 may be configured to receive information, data, and updates about a route. For example, the receiver 551 may be configured or operable to receive traffic information provided by a traffic provider. In some instances, traffic information may include or be about one or more location reference core points. For example, the navigation system 550 may receive information from or about each of the location reference core points on a road.

Location reference core points may be included in geographic or other databases and may be used to describe a road. Location reference core points may be or include extension points describing the first end and the second end of a road including the road segment to which the traffic event refers. For example, location reference core points may provide location information that may be used by a navigation system to calculate a route to a predetermined destination, or may be used for displaying map data of a geographic database. Various other examples are possible.

The navigation system 550 may also or alternatively include one or more processing units 552. The processing unit 552 may be or include hardware, software, or some combination thereof. The processing unit 552 may include a processor, such as a central processing unit (CPU), a graphics processing unit (GPU), or both. The processing unit 552 may be a component in a variety of systems. For example, the processing unit 552 may be part of a standard personal computer or a workstation. The processing unit 552 may be one or more general processors, digital signal processors, application specific integrated circuits, field programmable gate arrays, servers, networks, digital circuits, analog circuits, combinations thereof, or other now known or later developed devices for analyzing and processing data. The processing unit 552 may be, include, or implement a software program, such as code generated manually or programmed. Various other implementations are possible.

The processing unit 552 may be configured to identify or determine location reference extension points which may be used to describe a road segment in more detail. Location reference extension points may be derived from location reference core points. Location reference extension points may not lie along the road where a traffic event has occurred. Location reference extension points may exist in an area surrounding a road along which a traffic event has occurred. Location reference extension points may further define a portion of a road segment, described by location reference core points, along which a traffic event has occurred.

The processing unit 552 may identify or determine a first pair of two location reference extension points based on one or more location reference core points, such as based on one or more location reference core points included in traffic information received by the receiver 551. The first set of two location reference extension points may be identified or determined using or based on location reference core points. The first set of two location reference extension points may, for example, represent locations generally describing on which larger or more general road a road section is located. For example, the first set of two location reference extension points may identify a road along which the road segment is located on.

In some systems, the processing unit 552 may identify two or more geographic objects or areas on a road along which a traffic event is occurring. The two or more geographic objects or points may identify, denote, or otherwise describe a road or road portion which may lie between the two or more geographic points. The identifying of the two or more geographic objects or areas on a road, or an identification of the road itself, may be made by the processing unit 552 in various ways, such as by analyzing or consulting a database which may include a list or set of points or objects and roads along which the points or objects are located. In other systems, the first pair of two location reference extension points may be the core points. In some systems, the processing unit 552 may use various other functions, algorithms, and processes to identify or determine location reference extension points, such as using one or more of a Dijkstra or A* algorithm. In other systems, the processing unit 552 may identify or determine a first set of two location reference extension points as two geographic areas connected by, or between which lie or exist, a greater road. Other variations are possible.

The processing unit 552 may also be configured to determine a second set of two location reference extension points which may be used to further delineate or describe a location of a road segment. The second set of two location reference extension points may, in some instances, be closer to or lie in nearer proximity to the road segment. The second set of two location reference extension points may be identified or determined such that the road segment may be identified as lying on the road specified by the first set of two location reference extension points at a position where a line or roadway between the second set of two location reference extension points intersect the road specified by the first set of two location reference extension points. In some of these systems, the road segment may be described as being located in the intersection or overlap between the greater road section and the connection between the second set of two location reference extension points.

The processing unit 552 may identify the second set of two location reference extension points in various ways. For example, the processing unit 552 may identify, such as by consulting or analyzing geographic data, one or more geographic objects or areas located within a determined or designated distance from the road described by the first two location reference extension points. As a specific example, the processing unit 552 may identify all geographic areas within a threshold distance from the road described by the first set of location reference extension points, or within a threshold distance from a point on the road at the center of the first set of location reference extension points. The processing unit 552 may then designate or determine two points from the gathered location reference extension points which may be used to further describe the location of the traffic event along the road described by the first two location reference extension points. For example, the processing unit 552 may analyze each possible set of two points, from the points within a distance from the road, to identify or determine two points which satisfy one or more criteria, which may be pre-determined or selected by a user. Examples of criteria may include two points that are an equal distance from the traffic event, two points which have a centerpoint at the traffic event, two points which describe a road segment that intersects at or near the traffic event, two points which describe a road segment which overlaps the road segment described by the first two location reference extension points at or near the road segment, or which satisfy various other selected or designated criteria. The processing unit 552 may then designate the two points which most closely represent the criteria as the second two location reference extension points. Various other methods of determining the second two location reference extension points are possible.

The processing unit 552 may select or determine the second set of two location reference extension points such that the road segment may lie in the middle of an overlap of the road segments. In other systems, the processing unit 552 may select or determine the second set of two location reference extension points such that the road segment may lie on the road specified by the first set of two reference points at a location in the middle of or directly between the second set of two reference points, or where the second set of two references points bisect the road specified by the first set of two reference points.

In other examples, the road segment may be described as lying or existing in an area of a road between the first set of two location reference extension points that also lies between an area of road between the second set of two location reference extension points. The processing unit 552 in this example may describe a road segment as lying or existing in an area of a road that overlaps roads or portions of roads identified using the first set of two location reference extension points and roads or portions of roads identified using the second set of two location reference points. Other variations are possible.

The navigation device 550 may also or alternatively include one or more message generating unit 553 and a transmitter (T) 554. In some systems, in place of or in addition to one or more of the receiver 551 or transmitter 554, the navigation device 550 may include a transceiver. Once the processing unit 552 has determined the four location reference points, the message generating unit 553 may create or otherwise generate and output a traffic message. The four locations may be added to the message as location reference extension points. The generated message may then be transmitted by the transmitter 554, and may be broadcast in a radio channel.

The traffic message may be generated and output, for example, using encoding rules known from ISO 17572-3. The ISO 17572-3 (2008) protocol, also referred to as dynamic location reference ("DLR") 1 or Agora-C, is a protocol that may be used or adhered to for identifying or describing road segments for road traffic messages. Under the ISO 17572-3 standard, a location reference corresponding to objects in geographic databases may be described in a standard unambiguous manner independent of and without the need for a geographic database produced by vendors of different applications. Rather, the ISO 17572-3 standard may utilize dynamic location reference techniques where encoding rules may be used to encode a description of a road segment in which a traffic event has occurred. In encoding a description of a road segment, location reference core points may be used and may provide a minimum specification for a location reference, as well as a complete and sufficient set of rules for all locations in traffic telematics. The ISO 17572-3 standard also uses location reference extension points which are extended for referencing destination locations.

FIG. 5 also shows a receiving device 560. The receiving device 560 may, for example, be or include part of a navigation system incorporated in a vehicle, may be a radio receiver, or may be various other devices. The receiving device 560 may include a receiving unit or receiver 561. The receiver 561 may be configured to receive the broadcast traffic message including the description of the road segment that may be sent by the transmitter 554.

The receiving device 560 may also or alternatively include a decoder 562. The decoder 562 may be configured or operable to decode the broadcast traffic message received by the receiver 561, where the message is encoded. In systems where the message is not encoded, no decoder 562 may be included or needed.

The receiving device 560 may also or alternatively include one or more information unit 563. An information unit 563 may, for example, generate a description of the road segment. For example, the information unit 563 may be configured to identify the first two location reference extension points in the broadcast traffic message as the locations generally describing on which road the road segment is located. The information unit 563 may also be configured or operable to identify the two second location reference extension points which may describe in more detail at which part of the road the closed road segment is located. The information unit 563 may also generate a message that a road segment of a road between two geographic areas is experiencing a traffic event (such as where the road is closed), and that the road segment is located more precisely between two other geographic areas or points.

The information unit 563 may decode broadcast traffic message and read or interpret one or more portions of the broadcast traffic message to identify the location reference extension points. For example, the information unit 563 may parse a message into one or more portions or fields. The information unit 563 may be programmed to recognize that the information in given fields may represent a location reference extension point. By parsing and analyzing the information received, and by identifying the information in specified fields as being location reference extension points, the information unit 563 may identify location reference extension points to describe a traffic event location. In some example, once the information unit 563 has identified the location reference extension points, the information unit 563 may determine the location of a traffic event by locating the center of the four locations identified by the location reference extension points. In other systems, the information unit 563 may determine the location of a traffic event according to various other instructions or algorithms, or in various other ways.

The receiving unit 560 may also include one or more display 564. The description determined by the information unit 563 may be output to a user on the display 564. The system 550 may include addition or fewer components. Furthermore, while the different elements shown in system 550 and the receiver 560 are shown as separate entities, it should be understood that the discussed functions may be incorporated in other units or modules contained in system 550 or receiver 560. Furthermore, the different functions shown may be incorporated by hardware or software or as a combination of hardware and software.

Figure 6:
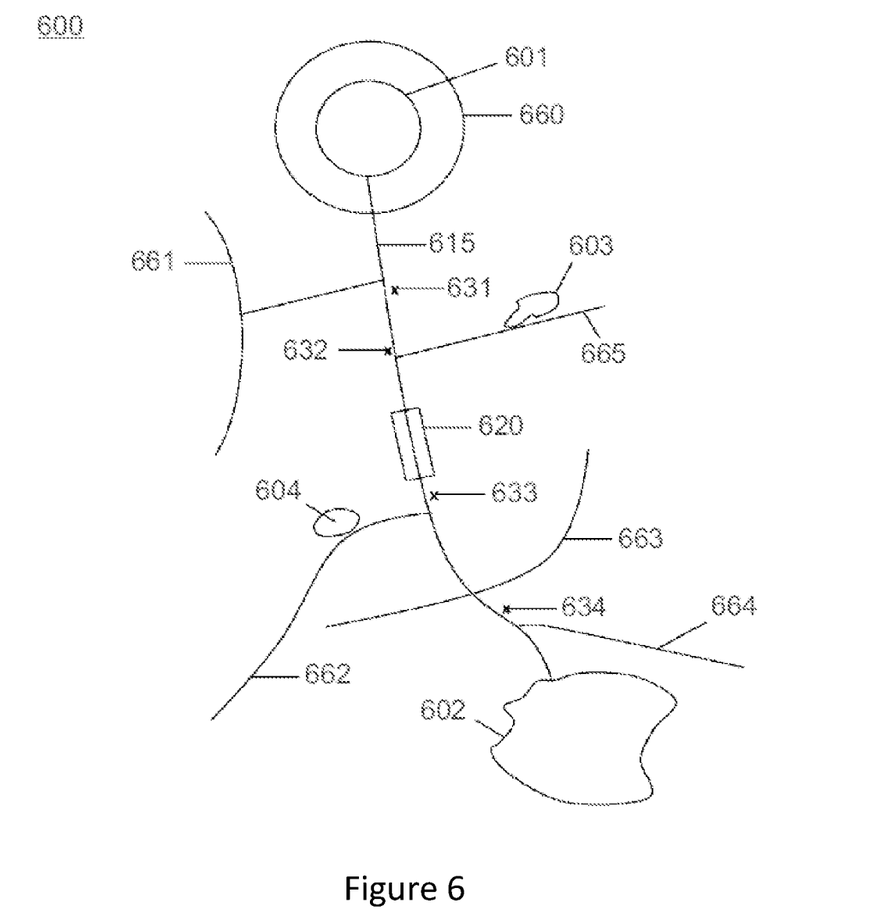
FIG. 6 is a diagram of an example route section is a geographic setting.

FIG. 6 shows an example road network 600 with a road segment 620 having or experiencing a traffic event. The navigation system 550 may identify and describe the road segment 620 using one or more location reference extension points and core points.

The road 615, along which the road segment 620 is located, may run, lie, or be located between a first geographic area 601 and a second geographic area 602. The road 615 may be a road of any road category or classification. For example, the road 615 may be a low class road which may not be a highway or motorway, and which may have many junctions and intersections. In addition to the road 615, the road network 600 may include various other roads, such as a circle road 660 around the geographic area 601 and roads 661-665.

The road network 600 may include geographic areas 601, 602, 603, and 604. One or more of the geographic areas 601, 602, 603, and 604 may be the same as, similar to, or otherwise resemble one or more geographic areas 101-102, 201-203, or 401-413, and may be, for example, a village, town, city, urban agglomeration, geographic feature such as a mountain or forest, designated area such as a parking lot, neighborhood, or bounded area, or may be various other geographic features or areas.

The navigation system 550 may use location reference core points 631, 632, 633, and 634 to represent the road 615 represented in a geographic database. The location reference core points 631-634 may, for example, provide location information that may be used by a navigation system to calculate a route to a predetermined destination, or may be used for displaying map data of a geographic database.

The navigation system 550 may receive traffic information from a traffic provider, such as by or through the receiver 551. For example, the navigation system 550 may receive traffic information from or about each of the location reference core points 631-634. When the navigation system 550 receives the traffic information including the core points 632 and 633, the navigation system 550 may be configured or operable to identify that, based on the received traffic information, a traffic event is occurring at a road segment 620. For example, the traffic information received by the navigation system 550 may include traffic speeds or congestion. The navigation system 550 may be configured to internally and unambiguously identify the road segment 620 where the traffic is becoming heavy, not moving, or slowing down, based on the traffic information.

In some instances, however, the navigation system 550 may not output the core points 632 and 633 directly to a user as identifiers for the road segment 620, as the user may not be able to interpret and correctly understand information provided by the two core points 632 and 633. For example, the core points 632 and 633 may merely be tower stations set along a length of a road, and may not be identifiable to a user. Instead, the navigation system 550 may identify, determine, and output location reference extension points to identify the road segment 620. For example, the navigation system 550 may identify and describe the road segment 620 by determining two location points describing a greater road section including the road segment 620. These two location points may be the geographic areas 601 and 602, which may delimit or otherwise delineate the road 615 and included road segment 620. These two location points may be identified, designated, or determined as the first set of two location reference extension points.

Within the greater road 615, the road segment 620 may be described in further detail as lying between the two other geographic areas. For example, the geographic areas 603 and 604 may be more specific than the geographic areas 601 and 602, as the geographic areas 603 and 604 may be within a closer proximity to each other. As such, the geographic areas 603 and 604 may be identified as being the second set of two location reference extension points. As such, in addition to describing or specifying the road segment 620 as lying on the road 615 between locations 601 and 602, the navigation system 550 may also describe or specify the road segment 620 as being located between the geographic areas 603 and 604.

By considering points and geographic areas, such as geographic areas 603 and 604, which may lie near the road 615, the navigation system 550 may identify or determine additional location points to be used for describing road segments.

The two geographic areas 601 and 602 describing the greater road section 615 are located at a greater distance to the road segment 620 than the two geographic areas 603 and 604 used to more clearly delimit the road segment 620 within the greater road section 615. In some systems, the road segment 620 may be described as being located in the intersection or overlap between the greater road section 615 and the connection between the geographical objects 603 and 604.

Figure 7:
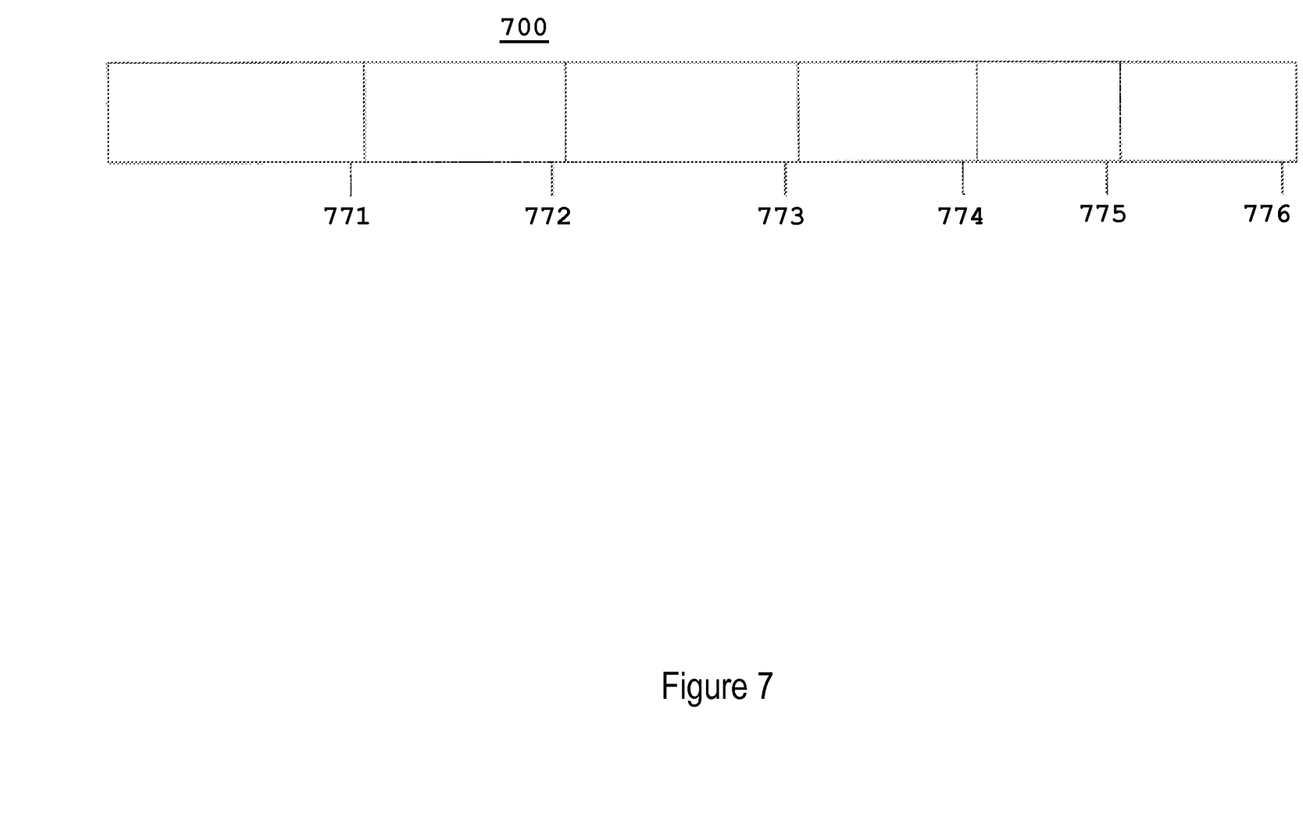
FIG. 7 is a diagram of an example component of a message generated by a navigation system.

The four location reference extension points may be used for the description of the road segment 620 output to the user by adding these four location points as location reference extension points to a traffic message containing the location reference core points 632 and 633. FIG. 7 shows an example of a schematic view of a coded traffic message 700 that may be generated or created by the message generating unit 553 of the navigation device 500. The traffic message 700 may be generated or created using one or more protocols or standards, such as the ISO 17572-3.

The message 700 may contain a first field 771 and a second field 772. The first field 771 and the second field 772 may each contain or include a location reference core point. For example, the first field 771 may contain a core point 632, and the second field 772 may contain the core point 633. The core points 632 and 633 may be encoded in the fields 771 and 772 using one or more encoding rules specified in further detail in ISO 17572-3, or in various other ways.

The traffic message 700 may also or alternatively contain four or more additional fields 773, 774, 775, and 776. Each of the fields 773-776 may contain or include a location reference extension point describing the road segment 620. For example, the first two location reference points in the fields 773 and 774 may be or include the location reference extension points 601 and 602 describing the greater road section 615 including the road segment 620. Additionally, the second two location reference extension points located in field 775 and 776 may describe in more detail the location of the closed road segment 620 as lying between the geographic areas 603 and 604. The four location reference extension points 773-776 need not necessarily be contained in the message in the order mentioned above, but may be provided in the message using any predefined order where the predefined order is known to the navigation system 550 generating the message and the receiving device 560 receiving and decoding the message.

In FIG. 4, the navigation system 550 may be configured or operable to describe the road section 420 using one or more location reference extension points and core points. In this example, the navigation system 550 may describe the road segment 420 by identifying or determining a first two location reference extension points identified with the two geographic areas 401 and 413. These first two location reference extension points may identify the greater road section along which the road segment 420 may be located or exist. The navigation system 550 may also identify or determine a pair of closer location reference extension points, such as geographic areas 401 and 409. For example, the navigation system 550 may search for geographic areas 401 or 409 that may be geographically closer to the traffic event than the first two location reference extension points. Using these four location reference extension points, (i.e., geographic areas 401 and 413, and geographic areas 401 and 409), the navigation system 550 may identify or describe the road segment 420 as being located at the intersecting or overlapping part of the road between the two geographic areas 401 and 413 and a part of the road between, or line or segment connecting, the two second location reference points for the two geographic areas 401 and 409.

Figure 8:
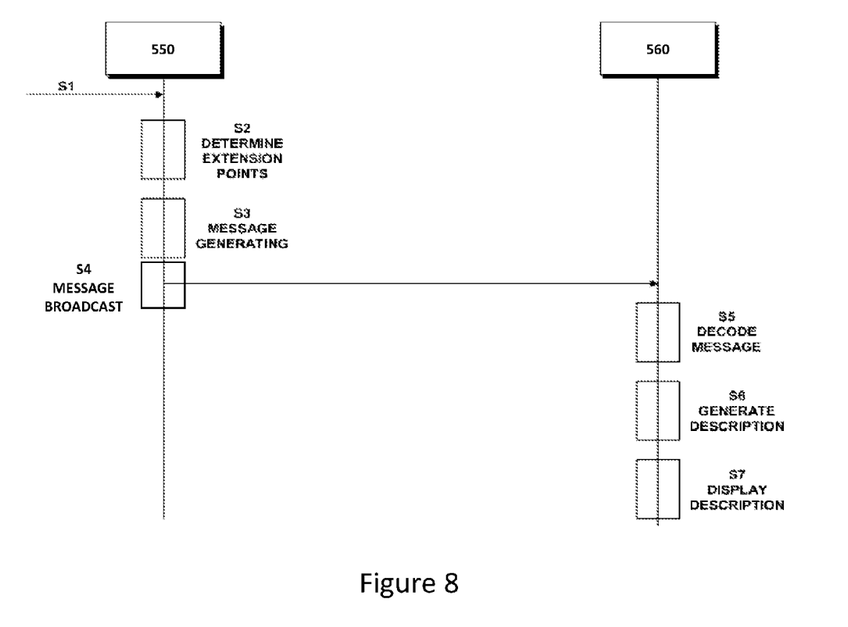
FIG. 8 is a state diagram of an example method for describing and displaying a road segment.

FIG. 8 shows an example method for generating and displaying a road segment description. In step S1, the navigation system 550 may receive traffic information from one or more traffic providers or data service providers. The traffic information provided may allow the navigation system 550 to determine two location reference core points with which the road segment can be unambiguously determined.

In step S2, the navigation system 550 may determine one or more location reference extension points using the core points determined or identified from the traffic information. For example, the navigation system 550 may determine four location reference extension points which may be used to unambiguously describe the road segment in a manner that can be understood by a user.

In step S3, the message generating unit 553 or another component of navigation system 550 may generate the traffic message. In generating the traffic message, the navigation system 550 may include the location reference extension points.

In step S4, when the message has been generated, the transmitter 554 or another component of the navigation system 550 may broadcast the message. In step S5, the receiving device 560 may receive the broadcast message, such as with the receiver 561. The decoder 562 or another component of the receiving device 560 may then decode the message.

In step S6, the information unit 563 may the two first location reference extension points describing the greater road section from the message. The information unit 563 may also or alternatively extract the two second location reference extension points describing in more detail the geographic objects limiting and describing in more detail the road segment. The information unit 563 may generate the road description based on the extracted location reference extension points. The information unit 563 may, for example, generate a message that a road segment of a road between cities, such as geographic areas 601 and 602, is closed, the segment being located more precisely between villages, such as geographic areas 603 and 604. In some examples, the four extended points may be determined by simply locating them at the center of the locations 601, 602, 603, and 604.

In step S7, the display unit 564 or another component of the receiving device 560 may display the generated description to the user. With the displayed information the user may be informed about the closed road segment.

The navigation system 550 may offer many benefits. The navigation system 550 may provide a description of a road segment using locations of a geographic database, the description of the road segment being output to a user and the road segment being identified in the geographic database on the basis of location reference points. This may allow for a unique identification of a road segment in the geographic database using a dynamic location references technique, such as a dynamic location references technique according to ISO 17572-3. The navigation system may be used for traffic telematics purposes, and may be used in connection with all possible road classes. The navigation system 550 may also transmit the description of the road segment and to a receiver receiving traffic messages that outputs the description of the road segment to a user.

The navigation system 550 may perform a method for providing a description of a road segment using ISO 17572-3. The navigation system 550 may perform the step of providing two first location reference points with which a greater road section including the road segment is described. One of the two first location reference points may correspond to a geographic object located at a first end of the greater road section and the other of the two first location reference points may correspond to a geographic object located at a second end of the greater road section. The navigation system 550 may also provide two second location reference points with which a position of the road segment within the greater road section may be geographically defined more precisely by defining a subsection of the greater road section in which the road segment is located using the two second location reference points. By providing the two first location reference points delimiting the greater road section and by providing the two second location reference points that further delimit a part of the greater road section where the road segment is located, the navigation system may obtain a description that may be output to a user and which may allow the user to more easily understand where the road segment actually is located. The method may allow the identification of a road segment on smaller roads.

In some systems, the road segment is located on the overlap between a connection defined by connecting the two first location reference points and a connection defined by connecting the two second location reference points. This overlap or intersection may mark the part of the greater road section where the road segment is located.

In some systems, the two second location reference points are located closer to the road segment than the two first location reference points. In some systems, one of the second location reference points may also be, at the same time, a first location reference point. This may be the case, for example, when the road segment is located very closely to the geographical area or object that is used to also describe the greater road section. In some of these examples, the combined distance from one of the two second location reference points and the other of the two second location reference points to the road segment may be closer than the distance from the first location reference points to the road segment.

The navigation system 550 may identify the road segment in the geographic database on the basis of location reference core points. The two first and the two second location reference points may be location reference extension points which may be added to the location reference core points. The location reference extension points may be used by the navigation system 550 for the description of the road segment to be output to the user. As an example, the location reference extension points, which may be used for a different purpose in ISO 17572-3, may be added to the core points and used to describe in detail the road segment.

The navigation system 550 may generate a description of the road segment using the provided descriptions. The road segment may be described by describing the greater road section using the two first location reference points and by describing the subsection within the greater road section using the two second location reference points. By adding the four location reference points, such as location reference extension points, a part of a road in which a traffic event may have been detected or which may be closed may be described in such a way that a user to which the description is output can understand in which part of the geographic database the traffic event has occurred.

The navigation system 550 and receiving device 560 may output the road description in various ways. For example, the road description may be a generated textual output. However, it should be understood that the description of the road segment may be output to the user using a text-to-speech system so that the user can listen to the description of the road segment, as video or images, or in various other ways.

As a specific example of the use of the navigation system 550, a road segment may be uniquely identified when the first two location reference points describe geographic objects located on one end and on the other hand of the greater road section, and when the second two location reference points describe geographic objects that further delimit the road segment on the road. By way of example, the first two location reference points may correspond to villages or cities which are connected by the greater road section and where a certain road segment is closed. The first two location reference extension points may allow the user to identify the road in general, e.g. the road from village A to village B. The second two location reference extension points describing in further detail which part or subsection of the road between village A and village B is closed.

Another example of the navigation system 550 may be a system that may generate a description of the road segment based on the ISO 17572-3 standard. The system may include a receiver receiving information about the road segment. The information may be a traffic event occurring at the road segment. The system may also include a processing unit configured to determine the two first location reference points mentioned above and the two second location reference points mentioned above. The system may also include a message generating unit generating a description for the road segment to be output to the user, the description containing the two first location reference points and the two second location reference points. The two first and the two second reference points may be location reference extension points or various other points. The message generating unit may generate the message based on the encoding rules described in ISO 17572-3.

The system may also include a transmitter transmitting the message to a receiver where the message is received, decoded and in which an information unit can be provided configured to generate the description of the road segment output to the user. The determination of the two first location reference extension points and two second location reference extension points may be a processing step resulting in high computing load. Thus, this step may be carried out in a central server where the information about a traffic event at the road segment is collected. This central server may generate the message. A broadcasting unit may transmit the message to the receiver where the message is decoded and the message is displayed to the user. In another system, the determination of the two first location reference extension points and two second location reference extension points may be done in the receiver itself. In some of these systems, the receiver may only receive the two location reference core points to identify the road segment in the geographic database, after which the receiver may determine the two first and two second reference extension points based on the received reference core points. Various other examples are possible.

The term "module" may be defined to include a number of executable modules. The modules may include software, hardware or some combination thereof executable by a processor or processing unit. Software modules may include instructions stored in memory that may be executable by a processor or processing unit. Hardware modules may include various devices, components, circuits, gates, circuit boards, and the like that may be executable, directed, and/or controlled for performance by a processor or processing unit.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

I claim:

1. A computer-implemented method for providing a description of a road segment, the method comprising:
   selecting two first location reference extension points to identify a road that includes the road segment, wherein a first point of the two first location reference extension points corresponds to a first location along the road and a second point of the two first location reference extension points corresponds to a second location along the road;
   determining a first distance between the first point and the road segment and a second distance between the second point and the road segment;
   selecting, based on the first distance and the second distance, two second location reference extension points to identify a portion of the road that is located between the first location and the second location, wherein the portion of the road includes the road segment;
   generating, via a processor, the description of the road segment based on the two first location reference extension points and the two second location reference extension points, wherein the description identifies the road using the two first location reference extension points and identifies the road segment using the two second location reference extension points;
   generating a textual output of the road segment based on the description; and
   causing the textual output to be outputted to a display.

2. The computer-implemented method of claim 1, wherein the first point of the two first location reference extension points corresponds to a geographic object located at the first location along the road, and the second point of the two first location reference extension points corresponds to a geographic object located at the second location along the road.

3. The computer-implemented method of claim 1, wherein a portion of the road segment is located at a connection point representing an intersection between a first path connecting the two first location reference extension points and a second path connecting the two second location extension reference points.

4. The computer-implemented method of claim 1, wherein the road segment represents a portion of the road where a traffic event has occurred.

5. The computer-implemented method of claim 1, wherein the two second location reference extension points delimit the road segment on the road.

6. The computer-implemented method of claim 1, wherein the two first location reference extension points and the two second location reference extension points are selected based on one or more of: a distance to the road segment, a name of a road between the respective location reference extension points, and a population of geographic areas corresponding to the respective location reference extension points.

7. The computer-implemented method of claim 1, wherein each of the selected two second location reference extension points are located along the road.

8. The computer-implemented method of claim 1, wherein at least one of the selected two second location reference extension points is located along a second road, and wherein the portion of the road is identified using a location reference point where the road and the second road intersect.

9. The computer-implemented method of claim 8, wherein one of the selected two second location reference extension points is located along a second road, wherein another one of the selected two second location reference extension points is located along a third road, and wherein the portion of the road is identified using location reference points respectively located at intersections of the road with the second and third roads.

10. The computer-implemented method of claim 1, wherein the two second location reference extension points are not located on the road.

11. A system for generating a description of a road segment, the system comprising:
 a receiver configured to receive information about the road segment;
 a processing unit configured to:
  determine two first location reference extension points identifying a road that includes the road segment, wherein a first point of the two first location reference extension points corresponds to a first location along the road and a second point of the two first location reference extension points corresponds to a second location of the road,
  determine a first distance between the first point and the road segment and a second distance between the second point and the road segment; and
  determine, based on the first distance and the second distance, two second location reference extension points identifying a portion of the road that is located between the first location and the second location, wherein the portion of the road includes the road segment; and
 a message generating unit configured to:
  generate the description of the road segment based on the two first location reference extension points and the two second location reference extension points, wherein the description identifies the road using the two first location reference extension points and identifies the road segment using the two second location reference extension points, and
  generate a textual output of the road segment based on the description.

12. The system of claim 11, wherein the two second location reference extension points identify geographic objects that delimit the road segment of the road.

13. The system of claim 12, wherein the geographic objects are villages or urban agglomerations.

14. The system of claim 11, wherein the two first location reference extension points and the two second location reference extension points are selected based on one or more of: a distance to the road segment, a name of a road between the respective location reference extension points, and a population of geographic areas corresponding to the location reference extension points.

15. The system of claim 11, wherein the two second location reference extension points are not located on the road.

16. A receiving device configured to alert a user about a traffic event on a road segment, the receiving device comprising:
 a receiving unit configured to receive a message, the message comprising:
  two first location reference extension points identifying a road that includes the road segment experiencing the traffic event, wherein a first point of the two first location reference extension points corresponds to a first location along the road and a second point of the two first location reference extension points corresponds to a second location along the road, and
  two second location reference extension points identifying a portion of the road that is located between the first location and the second location, wherein the portion of the road includes the road segment, and the two location reference extension points are determined based on a first distance between the first point and the road segment and a second distance between the second point and the road segment;
 a decoder configured to decode the received message and extract the two first location reference extension points and the two second location reference extension points; and
 an information unit configured to:
  generate a description of the road segment based on the two first location reference extension points and the two second location reference extension points, wherein the description identifies the road using the two first location reference extension points and identifies the road segment using the two second location reference extension points, and
  generate a textual output of the road segment based on the description.

17. The receiving device of claim 16, wherein the two second location reference extension points identify geographic objects that delimit the road segment of the road.

18. The receiving device of claim 16, wherein the two first location reference extension points and the two second location reference extension points are selected based on one or more of: a distance to the road segment, a name of a road between the respective location reference extension points, and a population of geographic areas corresponding to the location reference extension points.

19. The receiving device of claim 16, wherein the two second location reference extension points are not located on the road.

* * * * *